June 3, 1958 H. A. MICHLIN 2,837,676

METHOD AND MEANS FOR OPTICALLY REDUCING THE PERCEPTIBLENESS OF DISCRETE COMPONENT COLOR ELEMENTS OF A COLOR IMAGE

Filed Feb. 20, 1956 2 Sheets-Sheet 1

2,837,676

METHOD AND MEANS FOR OPTICALLY REDUCING THE PERCEPTIBLENESS OF DISCRETE COMPONENT COLOR ELEMENTS OF A COLOR IMAGE

Hyman A. Michlin, New York, N. Y.

Application February 20, 1956, Serial No. 566,564

17 Claims. (Cl. 313—92)

Figures 1, 2, 3:
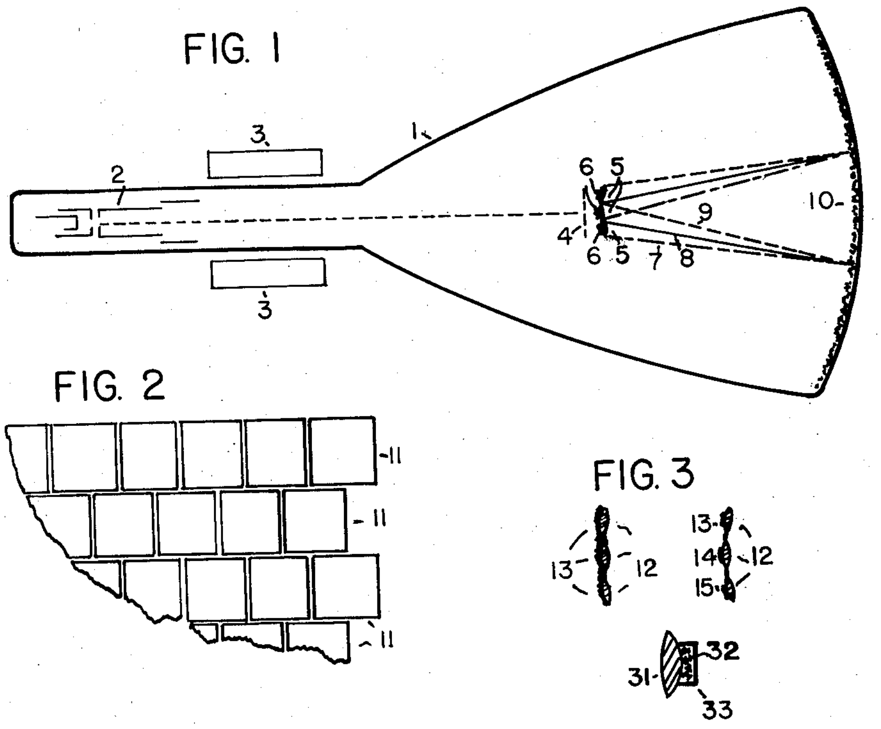

This invention relates to the optical reducing of the perceptibleness of discrete component color elements of a color image to form a color image having congruous or natural color picture elements.

The development in color television appears to be in the direction of larger color images with the source of the color image rays, whether by direct view color kinescope or indirect projection television, electronically produced on a single luminescent screen having perceptible discrete component color elements when viewed at a near distance, but when viewed at a suitable distance the visual processes of a viewer combines these perceptible discrete component color elements to be thereby made imperceptible so as to form a congruous color image with congruous color picture elements. Therefore, there appears to be a necessity for a method and means for overcoming the shortcomings of the visual processes when discrete component color elements are so perceptibly presented to the visual processes that they cannot be combined in the visual processes and so remain disturbingly perceptible and discrete so that an image is made sketchy or cannot be formed therein. Therefore, it is obvious, that unless the television system standards are changed so as to allow for an increase in intelligence for carrier or other transmission, that as the color image is made larger that the discrete component color elements will become disturbingly perceptible unless the color image is viewed from a greater distance which puts a limit to the size of the color image in any room size and yet produce a congruous color image in the visual processes of a viewer.

Present refractive and/or reflective optical systems are designed to minimum standards of definition or sharpness beyond which the optical system is deemed defective due to overlapping of elemental parts of an image. This invention proposes to overcome the above said defect of disturbingly perceptible discrete component color elements by optically overlapping the discrete component color elements of each color picture element so as to reduce or avoid their perceptibleness. This is a development in the optical sciences to produce a color image in a direction different than hitherto proposed which in the past has been to form each of the elements of a color image in as high a definition as possible.

The term "color viewing screen" as here used is intended as a generic term to include color reflecting, color translucent or color luminescent viewing screens, as are described below, and on which the final color image is formed for viewing.

One object of this invention is to provide a new direction in the art of optics to overlap as much as possible perceptible discrete component color elements of each color picture element of a color image to produce congruous color picture elements.

Another object is to provide a generic method and means to overlap perceptible discrete component color elements of a color image so as to reduce the perceptibleness of the component color elements to thereby produce a natural or congruous color image.

Another object is to provide generic method and means to produce enlarged natural or congruous color images from color images having perceptible discrete component color elements while reducing the perceptibleness of the discrete component color elements.

Another object is to provide a method for producing congruous color picture elements from a color image having color picture elements made incongruous by perceptible discrete component color elements.

Another object is to provide color television wherein the light rays from each of the component color elements are enlarged so as to overlap each other to form a natural or congruous color image.

Another object is to provide a television color image reproducing system wherein the light rays from each of the discrete component color elements of a luminescent phosphor color screen are optically overlapped on a color luminescent viewing screen so as to form a natural or congruous color luminescent image.

Another object is to provide a direct view color kinescope with its luminescent screen of such size for optimum operation to form a high quality luminescent image representative of a color image having discrete component color elements, and an optical means to enlarge and overlap each of the representative discrete component color elements of each color picture element on a color luminescent viewing screen so as to form a congruous or natural color image.

Another object is to provide a direct view color kinescope in which the image is formed by electronic and optical means for optimum efficiency.

Another object is to provide color television wherein the light rays from each of the perceptible discrete component color elements of each color picture element are overlapped on the color viewing screen so as to form a natural or congruous color image.

Another object is to provide a phosphor screen in color capable of forming an image in different radiant energies representative of discrete component color elements of a color image, and capable of having each of the elemental areas of each representative component color emitting phosphor separately focused to overlap each other.

Another object is to provide an integrated unit of a plurality of separately focusing optical elements and phosphors so as to maintain constant relative focusing and alignment so as to overlap discrete component color elements.

Another object is to provide an integrated unit of a plurality of separately focusing optical elements and phosphors backed up for reflection so as to efficiently transmit light rays to areas intended due to the source of the light rays being so near to the reflecting and optical elements.

These and other objects, features and advantages of my invention will become apparent when considered in view of the following description of this generic invention and its various modifications in methods and apparatus when taken in connection with the accompanying drawings wherein:

Figure 1 schematically illustrates the invention in a direct view kinescope electronically and optically producing a color image.

Figure 2 schematically illustrates overlapping of discrete component color elements with their perceptibleness obviated.

Figure 3 is a perspective top and side illustration of a phosphor line screen for color kinescope in an integral combination of a plurality of optical elements for each phosphor line for overlapping elemental areas from each phosphor line to form congruous color picture elements; and a combination of reflecting surface, phosphors and optical element.

Figures 4, 5, 6:
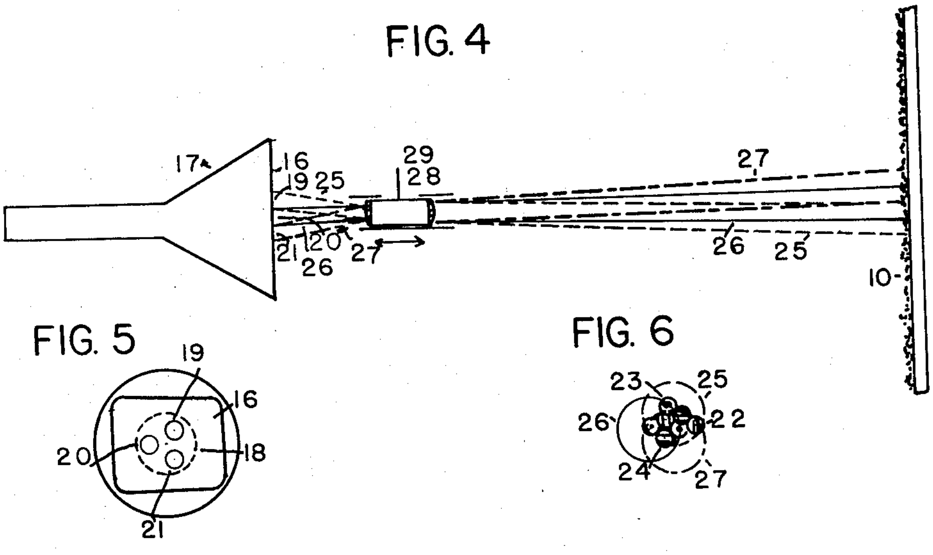

Figure 4 schematically illustrates a mode of the invention.

Figure 5 schematically illustrates a group of three phosphor dots of a phosphor dot screen and representative of one picture element in a color kinescope.

Figure 6 schematically illustrates overlapping of component colors on a color luminescent viewing screen.

Figure 7:
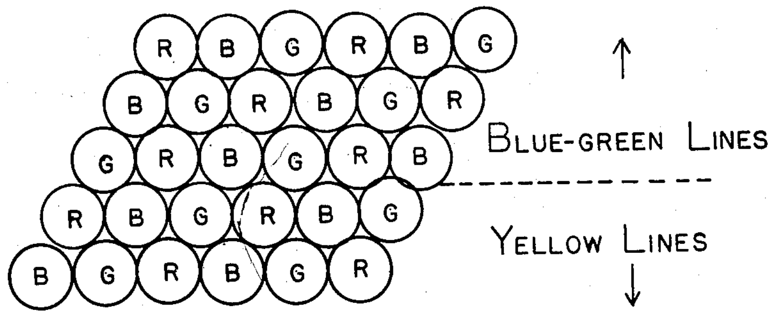

Figure 7 is a perspective view of a phosphor dot screen arrangement in a color kinescope.

Figure 8:
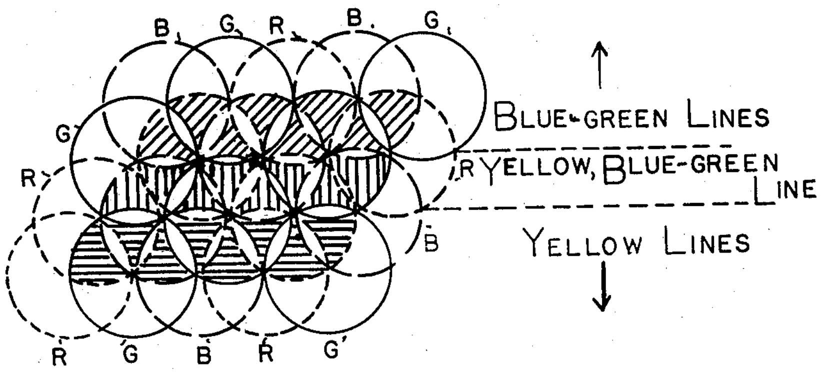

Figure 8 schematically illustrates overlapping of component colors on a color viewing screen.

Figure 9:
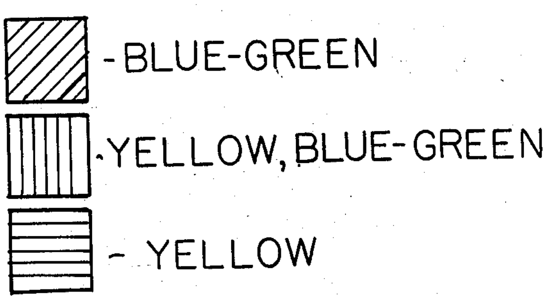

Figure 9 is a legend identifying resultant colors of overlapping areas of circles of confusion in Figure 8.

Figure 10:
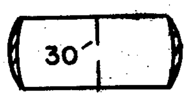

Figure 10 schematically illustrates a variation of means to produce and control the size of circles of confusion.

One method of this invention is to separately and sharply focus each of the light rays from each of the perceptible discrete component color elements forming each color picture element so as to overlap each other so as to form natural or congruous color picture elements to form a natural or congruous color image.

Referring to Figure 1 to illustrate a mode of the invention:

Figure 1 schematically illustrates a color kinescope (examples of which are found in the R C A Review, vol. XII, No. 3, part 2, September 1951, pages 466–502) having conventional elements of a vacuum envelope 1, electron gun 2, deflecting means 3, aperture or shadow mask 4, and in addition a plurality of optical elements 5 made of quartz each optical element having a perceptible discrete phosphor layer 6 emitting a luminescent excitation radiant energy in a square area with each in a different peak part of the ultra-violet spectrum. The shadow mask 4 and phosphor elements 6 are conventional elements in said color kinescope used in forming the resultant color image having discrete component color elements in each of the resultant color picture elements; but, for each of explanation, only a portion of mask 4 and a side view of three of the plurality of optical elements 6 each having a phosphor layer 5 for forming one resultant color picture element on color viewing screen 10 are illustrated. One luminescent excitation radiant energy is in a peak high frequency part of the ultra-violet spectrum and is representative of the blue component color of color picture elements of a color image and which is indicated between the dot and dash lines 7. Another luminescent excitation radiant energy is in another peak part of the low frequencies of the ultra-violet spectrum and is representative of the red component color of color picture elements of a color image which is indicated as between the straight lines 8. Another luminescent excitation radiant energy is in a peak part between the said high and low frequencies of the ultra-violet spectrum and is representative of the green component color of color picture elements of a color image and which is indicated as between the dash lines 9. The color viewing screen 10 in this instance is a color luminescent viewing screen made up of a phosphor layer in a mixture of three different kinds of phosphor particles, one kind of phosphor particles is sensitive to excitation to a blue component color by said high frequency part of the ultra-violet spectrum; another kind of phosphor particles is peak sensitive to excitation to red component color by said low frequency part in the ultra-violet spectrum; and the other kind of phosphor particles is peak sensitive to excitation to green component color by frequencies in the ultra-violet spectrum between the said high and low frequencies. The use of two color screens of phosphors in which one color phosphor screen is electronically scanned and impacted to produce and emit in luminescent excitation radiant energies which is focused on the second color screen, which is a color luminescent viewing screen, where it excites a color image is disclosed in the Cage Patent No. 2,553,182 and, therefore, it is prior art. Further, there are many materials to effect the same as is known to those skilled in the art. Therefore, the color luminescent viewing screen is prior art just as is the color translucent viewing screen and the color reflecting viewing screen so that it becomes necessary to include all three said color viewing screens in a generic term for easier description.

Of the three said color viewing screens, the color translucent viewing screen is preferred; and in this connection it is to be noted that a ground glass, of the type used as a focusing glass in a camera, can be used in the color translucent viewing screen. So that the phosphors 6 emitting in component colors are overlapped to form a color picture element on the ground glass surface so as to completely eliminate the perceptibleness of discrete component color elements of each color picture element of a color image, as is illustrated in Figure 2, the phosphor elements 6 are each in the form of a square area so that on enlargement and focusing the light rays from said square areas from each color picture element are in proper overlapping register, there resulting in overlapping of light rays from the component color elements of each color picture element of a plurality of color picture elements as is schematically illustrated by each square area 11 in Figure 2 so as to form color picture elements without perceptible discrete component color elements. It appears obvious that as the surfaces of each of the phosphor elements 6 on each optical element 5 is in the form of a square area, then each color picture element 11 in Figure 2 would be in a square form; and where they fully overlap in register each in their respective color picture element 11, it would result in congruous or natural color picture elements 11.

Figure 3 schematically illustrates a top and side view of a modification of a combination of an integral unit of a plurality of optical elements 12 and lines of phosphor layers 13, 14 and 15 each emitting in a different component color as used in the phosphor line screen color kinescope, one example of such screen is found on pages 546–547 in the above-said R C A Review, with the optical elements forming an integral unit and designed and arranged to focus in register as are the plurality of optical elements 5 in Figure 1. The use of lines of phosphors makes for ease of manufacture. In case of mass production the plurality of optical elements can be multiple ground with the surfaces where the phosphors are placed in a common plane for ease of putting phosphors and reflecting surfaces thereon, with the focussing and alignment of each of the optical elements arranged and designed to overlap the component color elements of each color picture element of a color image.

Referring again to Figure 3. Where there is an aluminum backing 33 on the phosphors 32 then due to the reflecting element 33 and optical focussing elements 31 being in contact with and fully covering source of light rays from the phosphor elements 32, there would be a highly efficient selective transmission of light rays to desired areas by reason of reflection and optical focussing.

Referring again to Figure 1 to describe a mode of operation. The conventional elements electron gun 2 and deflecting means 3 generates, focuses and directs electron beam through aperture mask 4 in the manner of a single gun phosphor dot screen color kinescope so as to produce a color image as described on pages 487–502 in the above-said R C A Review. For purpose of illustration one red, one green and one blue emitting phosphor element 6 is impacted by scanning modulated electron beam so as to cause an intensity of emission in a component color from each phosphor element in accordance with the intensity of electron energy impacted thereon. Each optical element 5 focusses in register the component color elements of a color picture element on the color translucent viewing screen 10, as is illustrated, in overlapped area so that where a plurality of component color elements of a plurality of color picture elements are produced in the usual formation of a color image in a color kinescope, there would result in color picture elements 11 as are schematically illustrated in Figure 2 to form a color image without discrete component color elements.

Another method of this invention to obviate the above-said limitation of the size of a color televison image for any one room size, due to the structural and functional limitations by which discrete component color elements are perceptibly formed, is by focussing to overlap the radiant energies representative of each of the perceptible discrete component color elements of each of the perceptible discrete component color elements of each color picture element of a color image, is to increase the circles of confusion thereof so as to bring together the greater intensities of the inner cross-sectional areas of each of the circles of confusion of each of the light rays from each of the perceptible discrete component color elements forming each color picture element to thereby form congruous color picture elements; with the lesser intensities of the outer cross-sectional areas of each of the circles of confusion of the said light rays of each color picture element to overlap nearby color picture elements as at present under high definition or sharpness without noticeable effect on the final color image; and with the greater intensities of each of the inner cross-sectional areas of the circles of confusion of each of the radiant energies from each of the component color elements forming each color picture element dominating, except in the lines of separation between sharply focused and high contrast color areas, the resultant color of each color picture element so as to result in a reduction of the perceptibleness of each of the discrete component color elements of each color picture element while maintaining intelligence of each color picture element so as to produce a more congruous or natural color image. In effect high definition or sharpness is sufficiently reduced so as to defocus and bring together the component color elements and to maintain substantial focus of each of the color picture elements so as to produce a color image.

Where there are sharp lines separating high color contrasts, as referred to above, then there would be the disadvantage in that the area of sharp lines between colors would be a combination of both colors by reason of the overlapping of the like component color elements of other picture elements so as to reduce the sharpness of the image by reason of the overlapping but, this disadvantage is more than offset by reason of the color image being formed and the need in color television in making of large color images to reduce the perceptibleness of the discrete component color elements. Obviously where there is one color the color produced would be far superior over the perceptible discrete component color elements forming this one color; and where the color is in gradual change there is a marked superiority in good image without the disturbingly perceptible discrete component color elements.

Referring to Figures 7 and 8 to illustrate the principle of this mode of the invention. Figure 7 discloses the arrangement of perceptible discrete phosphor dots presently used, as schematically illustrated on page 469 of the above-said R C A Review, and wherein the light rays from the areas of the phosphor dots above the dotted lines is intended to be combined in the visual processes to appear blue-green in color; and wherein the light rays from the areas of the phosphor dots below the dotted line are intended to be combined in the visual processes to appear yellow in color.

As the visual processes combine the light rays from the neighboring phosphor dots, it appears that the first line between the dotted lines would be combined to produce a color other than the blue-green or the yellow. In this connection, it is to be noted that the combining of the different light rays from the neighboring phosphor dots is a visual process, and it appears, that by increasing the circles of confusion that this combining is effected in the color viewing screen as is shown in Figure 8 taken in connection with Figure 9 as it would be combined in the visual processes; so that the diagonal hatch lines in overlapped areas result in areas of blue-green color picture element, so that vertical hatch lines in overlapped areas result in areas of yellow, blue-green color picture elements, and so that horizontal hatch lines in overlapped areas result in areas of yellow color picture elements. It is to be noted that the perceptibleness of the discrete component color elements are greatly reduced with the added advantage that the areas not hatched are obviously nearer in color to the adjacent resultant colors as they are irradiated with at least two areas of like component colors.

Referring to Figures 4, 5 and 6 to illustrate this mode of the invention. The phosphor dot screen 16 of the color kinescope 17 (now in use in color television an example of which is disclosed in the above-said R C A Review, pages 487–502), for purpose of example, illustrates a single color picture element 18 with phosphor dot 19 emitting in a blue component color, the phosphor dot emitting in a green component color, and the phosphor dot 21 emitting in a red component color. The blue light rays 25 emitted from phosphor dot 19, the green light rays 26 emitted from phosphor dot 20, and the red light rays 27 emitted from phosphor dot 21 are transmitted through and focused by optical means 28 by movement of handle 29 so as to produce circles of confusion 25, 26 and 37 respectively (see Figure 6) with the overlapping parts thereof forming a color picture element on the color translucent viewing screen 10. If luminescent excitation radiant energies are emitted from electron impacted phosphor dot screen 16, as is noted above as prior art, then the color luminescent viewing screen would be used comprising different component color emitting phosphors, each sensitive to a different peak luminescent excitation radiant energy within the area of each color picture element (see Figure 6) where the phosphors 22, as indicated by vertical hatchlines in circles, are sensitive to low frequencies of the ultra-violet spectrum to emit in red color; where the phosphors 23, as indicated by dots in center of circles, are sensitive to high frequencies of the ultra-violet spectrum to emit in blue color; and where the phosphors 24, as indicated by the horizontal lines in circles, are sensitive to frequencies between the said high and low frequencies to emit in a green color. Although the color luminescent viewing screen is here described it is the color reflecting viewing screen that is preferred.

Figure 10 illustrates another means for varying the size of circles of confusion by different diaphragm or stop openings 30 as is well known in optics.

The drawings and specification are for illustration purposes and are not to be construed as restrictive; and, therefore, while I have disclosed several particular means and methods of practicing my invention, it will be obvious that other structures and modifications of methods may be of equal advantage, and, I therefore, do not wish to be limited to the particular methods and means set forth above except as my invention is so limited by the appended claims.

I claim:

1. The article of manufacture comprising in combination a component color emitting phosphor screen for color image reproduction having perceptible discrete phosphor elements and a separate optical element for each perceptible discrete component color emitting phosphor element.

2. The article of manufacture comprising in combination a component color emitting phosphor screen for color image reproduction having perceptible discrete phosphor elements and at least one separate optical element for each perceptible discrete component color emitting phosphor element.

3. The article of manufacture of claim 1 wherein said optical elements and the component color emitting phosphor screen are combined in an integral unit.

4. The article of manufacture of claim 2 wherein said optical elements and the component color emitting phosphor screen are combined in an integral unit.

5. The article of manufacture of claim 1 wherein the component color emitting phosphor screen is backed by a reflecting surface so as to effect efficient direction of emitting rays from the component color emitting phosphors in combination with said optical elements.

6. The article of manufacture of claim 3 wherein the component color emitting phosphor screen is backed by a reflecting surface so as to effect efficient direction of emitting rays from the component color emitting phosphors in combination with said optical elements.

7. The article of manufacture of claim 3 wherein the component color emitting phosphor screen is backed by a reflecting surface so as to effect efficient direction of emitting rays from the component color emitting phosphors in combination with said optical elements.

8. The article of manufacture of claim 4 wherein the component color emitting phosphor screen is backed by a reflecting surface so as to effect efficient direction of emitting rays from the component color emitting phosphors in combination with said optical elements.

9. The apparatus for reducing the perceptibleness of areas of component colors of each elemental color image area of a color image on a surface comprising a color image on a first surface, said color image having its elemental color image areas in perceptible areas of component colors; a second surface; and optical means to overlay the perceptible component color areas of each color image element on the second surface thereby reducing the perceptibleness thereof.

10. The apparatus of claim 9 for producing an enlarged color image with reduced perceptibleness of said areas of component colors of said each elemental color image area in which said means to overlap also enlarges each of said overlapped areas to produce an enlarged color image on said second surface.

11. The apparatus for reducing the perceptibleness of perceptible component color areas of each color image element of a color image comprising a source of radiant energies representative of a color image with its elemental color image areas in perceptible component color areas, a color viewing screen spaced therefrom, and optical means adapted to overlap on the color viewing screen the radiant energies representative of the said perceptible component color areas of each elemental color image area of the color image thereby reducing the perceptibleness of the component color areas.

12. The means for procuring a congruous color image from a color image having perceptible component color elements comprising means for forming an image in radiant energies representative of a color image having its elemental color image areas in perceptible component colors; a viewing screen adapted to be irradiated by said image in radiant energies and capable of transforming said image in radiant energies to a representative color image; and optical means arranged to overlap on the viewing screen the radiant energies representative of the perceptible component colors of each elemental color image area of the color image thereby reducing the perceptibleness of said perceptible component colors to produce a congruous color image.

13. A direct viewing color picture tube for reducing the perceptibleness of component color areas of each elemental color image area of a color image comprising a vacuum envelope; a luminescent screen having different radiant energy emitting materials, each said different material arranged in separate interspersed elemental areas; means to generate, focus and selectively direct electron energy to each of said interspersed elemental areas; a photoluminescent viewing screen; optical means arranged to focus in overlapped predetermined areas on the photoluminescent viewing screen radiant energies emitted from a plurality of selected elemental areas of the luminescent screen, each said selected elemental area emitting in a different radiant energy representative of a component color area of an elemental color image area; said photoluminescent viewing screen composed of different types of photoluminescent materials each peak sensitive to transforming a different radiant energy to a different component color, said each different type of luminescent material arranged to emit from smaller areas than said predetermined areas on said photoluminescent screen thereby reducing the perceptibleness of the component color areas focussed on the photoluminescent viewing screen.

14. The means of claim 12 in which the optical means is a plurality of independently focussing elements, each said independently focussing element suitably arranged in relation to one perceptible component color.

15. The direct viewing color picture tube of claim 13 in which the optical means is a plurality of independently foscussing elements, each said independently focussing element suitably arranged in relation to one interspersed elemental area.

16. The means of claim 14 in which the means for forming an image in radiant energies and the independently focussing elements form a composite member.

17. The direct viewing color picture tube of claim 15 in which the luminescent screen and the independently focussing elements form a composite member.

References Cited in the file of this patent

UNITED STATES PATENTS

| | | |
|---|---|---|
| 2,395,099 | Cage | Feb. 19, 1946 |
| 2,553,182 | Cage | May 15, 1951 |
| 2,601,328 | Rosenthal | June 24, 1952 |
| 2,682,620 | Sanford | June 29, 1954 |
| 2,683,834 | Wright | July 13, 1954 |
| 2,756,363 | Wright | July 24, 1956 |